Sept. 23, 1969   E. SCHMIDT   3,468,233
EXPOSURE MEASURING DEVICE FOR SINGLE LENS REFLEX CAMERAS
Filed Dec. 12, 1966

INVENTOR
Ewald Schmidt
BY
Krafft & Wells
ATTORNEYS

United States Patent Office 3,468,233
Patented Sept. 23, 1969

3,468,233
EXPOSURE MEASURING DEVICE FOR SINGLE LENS REFLEX CAMERAS
Ewald Schmidt, Braunfels, Germany, assignor to Ernst Leitz, G.m.b.H., Wetzlar, Germany
Filed Dec. 12, 1966, Ser. No. 601,157
Claims priority, application Germany, Jan. 20, 1966,
L 52,640
Int. Cl. G03b *19/12*
U.S. Cl. 95—42                                          4 Claims

ABSTRACT OF THE DISCLOSURE

A single lens reflex camera comprising an exposure measuring device which receives its light through a semi-transparent spot on the reflex mirror. A second mirror is rotatably connected to the rear of the mounting frame of the reflex mirror. Also a four bar linkage system can be used to swing the second mirror in the direction of the mounting frame when the reflex mirror is removed from the path of the light travelling to the film.

CROSS-REFERENCE TO RELATED APPLICATIONS

The disclosure of the copending U.S. application Ser. No. 478,068 filed Aug. 9, 1965 which corresponds to German application L 48,967 and is assigned to the assignee of the present invention is incorporated herein.

BACKGROUND OF THE INVENTION

In the above-mentioned copending application, a single lens reflex camera is described which comprises an exposure measuring device of the TTL (through the lens) measuring type. In this particular type of camera, the photoelectric resistor of the measuring circuit receives its light through the picture taking lens of the camera. To this end the reflex mirror of the camera is provided with a semi-transparent central spot through which part of the impinging light is transmitted. This transmitted light is reflected from a second mirror rotatably hinged to the carrier plate of the reflex mirror and the light is thus directed to the photoelectric resistor. At the moment of the exposure of the film, i.e., during the moment a picture is actually taken, the reflex mirror must be removed from the path of the light rays travelling from the inner surface of the lens to the film to be exposed. It is, therefore, known to swing the reflex mirror upwards in the direction of the viewing screen until it comes to rest against a frame surrounding said viewing screen. This serves at the same time to prevent any undesired feedback of light through the ocular via the roof prism. It is obvious, however, that the feedback of light cannot be prevented as long as the central semi-transparent spot of the reflex mirror remains uncovered. As described in the copending application, this is accomplished by rotating the second mirror about its pivot until it abuts against the reflex mirror, thus covering the semi-transparent spot.

DESCRIPTION OF THE INVENTION

It is an object of the invention to provide a new and improved structure adapted to swing said second mirror into its upper position in dependence on the reflex mirror being removed from the path of the light rays.

It is a further object of the invention to provide a new structure of the above-mentioned type, being adjustable according to various degrees of manufacturing tolerances.

Figure 1:
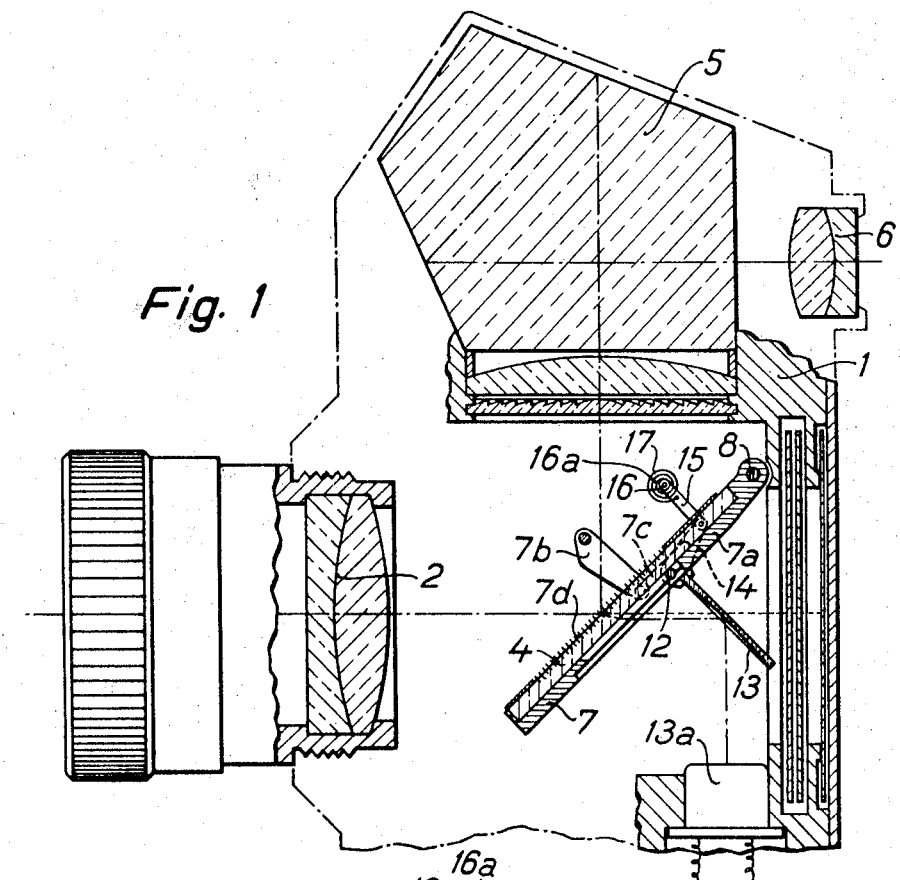
Figure 2:
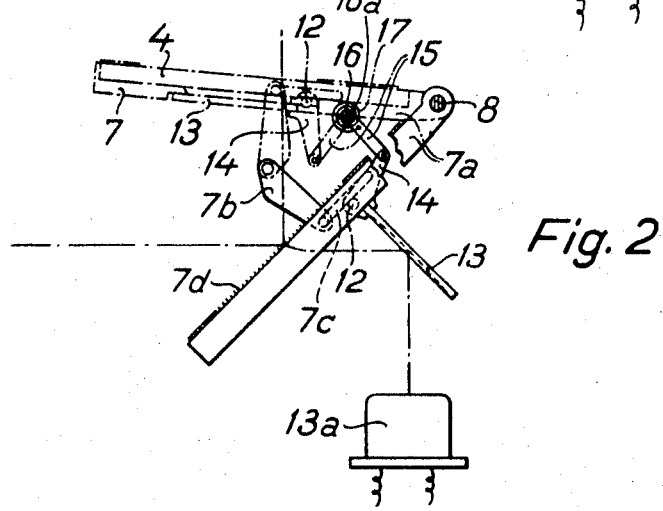

Other objects and advantages of this invention will become apparent upon reference to the accompanying description when taken in conjunction with the following drawings, wherein:

FIGURE 1 is a schematic cross-sectional side view of a mirror reflex camera with the mechanism for actuating the concave mirror; and FIGURE 2 is a schematic representation of the double swinging actuator in both of its terminal positions.

The camera housing 1 carries the objective 2, and is provided with the reflex mirror 4, the roof prism 5 and the ocular 6 as the view finder elements.

The reflex mirror 4 is supported in a mounting frame 7 which is pivotable about an axis 8 that is stationary in the housing. The swinging lever 7b engages slot 7c in the mounting frame 7 and is provided to remove the reflex mirror 4 from its viewing position to its picture taking position, as shown in dotted lines in FIGURE 2. The axis 12 on which the second mirror 13 is pivotable is seated in the mounting frame 7.

The second mirror 13 is adapted to reflect those light rays which in the viewing position of reflex mirror 4 and second mirror 13 are transmitted through the semi-transparent spot 7d onto the photoelectric resistance device 13a. The second mirror 13 is rigidly secured to the lever 14 which swings about the axis 12 while being pivotally connected to the swinging arm 15. The arm 15 is carried by a pin 16 which is adjustable laterally. This pin 16 is part of the cylindrical bolt 16a and is arranged eccentrically to the axis thereof.

The arm 15 has connected to it one end of a spiral spring 17, the other end of which is connected to the housing in the region of bolt 16a in such a manner that the spring will urge the swinging miror into either its observing position or its picture-taking position.

The device operates as described hereinafter. The portion 7a of the mounting frame from the axis 8 to the axis 12, together with the lever 14 and the swinging arm 15, form a linkage which in kinematics is known as a four bar linkage (an articulated quadrilateral), whose stationary fourth bar is the housing of the camera. The axis 8 and the pin 16 are the stationary pivot axes of this system, the lever 14 being the connecting bar, the swinging bar 15 the driven bar, and the portion 7a of the mounting frame the actuating bar or crank. The specific dimensions of these bars are such that they will form a four bar linkage commonly known as a double swing. The dimensions of these parts being such that the second mirror 13 which is fastened to the lever 14 will be swung upwardly in clockwise direction, as viewed in FIGURES 1 and 2, by the cranklike action of the frame portion 7a in addition to the upward swinging movement of the mounting frame 7 so that the second mirror 13 seats itself against the lower side of the mounting frame 7 in the position shown in dotted line in FIGURE 2, and in this upward movement it will be assisted by the spiral spring 17. If the reflex mirror 4 is brought back into its observing position, the second mirror 13 will at the same time be swung out into its operative position against the force of the spring 17.

The frame portion 7a, the lever 14 and the swinging arm 15 which constitute the four bar linkage are subject to manufacturing tolerances. This may lead to an incompleteness in closing the semi-transparent spot of the reflex mirror 4. This disadvantage can, however, readily be overcome by rotating bolt 16a, thereby actuating at the same time and laterally shifting pin 16. Further relief from this disadvantage will be found by arranging spiral spring 17 in opposite direction.

It will be understood that this invention is susceptible to modification in order to adapt it to different usages and conditions and, accordingly, it is desired to comprehend such modifications within this invention as may fall within the scope of the appended claims.

What is claimed is:
1. A single lens reflex camera having:
   (a) a housing;
   (b) an objective on the housing;
   (c) an exposure meter mounted in the housing comprising a photosensitive element adapted to receive its light through the objective;
   (d) a first pivot (8) on the housing;
   (e) a mounting frame having one end pivoted on said first pivot.
   (f) a reflex mirror carried by said mounting frame, said reflex mirror having a semi-transparent spot;
   (g) a second pivot (16) on the housing at a given distance from said first pivot, the portion of the housing therebetween defining the stationary bar of a four-bar linkage;
   (h) a third pivot (12) on the mounting frame at a given distance from said first pivot, the portion of the frame therebetween (7a) defining the actuating bar of a four-bar linkage;
   (i) a swinging arm (15) defining the driver of a four-bar linkage having one end pivoted on said second pivot and having a second end;
   (j) a rotatable lever (14) defining the connecting bar of a four-bar linkage having one end pivoted at said second end of the swinging bar and the other end pivoted at said third pivot; and
   (k) a second mirror (13) rigidly connected to said rotatable lever whereby light rays are transmitted through the transparent spot onto the photosensitive element when the reflex mirror is positioned in the path of the light rays and the second mirror is placed adjacent the transparent spot when the reflex mirror is removed from the path of the light rays.

2. The camera of claim 1, wherein resilient means connect said second pivot and said swinging arm whereby said second mirror is urged toward said mounting frame.

3. The camera of claim 1, wherein resilient means connect said second pivot and said swinging arm whereby said second mirror is urged away from said mounting frame.

4. The camera of claim 1, wherein said second pivot comprises means for adjusting one of the pivot axes of the four-bar linkage, said adjusting means comprising a pivot pin protruding eccentrically from one end of a rotatable bolt for adjusting the pivot pin laterally of itself.

References Cited

UNITED STATES PATENTS 3,332,331   7/1967   Mandler _____ 95—42

OTHER REFERENCES

Ham and Crane, Mechanics of Machinery, 3rd ed., pp. 17–23.

NORTON ANSHER, Primary Examiner

RICHARD L. MOSES, Assistant Examiner

U.S. Cl. X.R.

95—10